(12) United States Patent
Khanke et al.

(10) Patent No.: US 8,812,979 B2
(45) Date of Patent: Aug. 19, 2014

(54) FEATURE LICENSE MANAGEMENT SYSTEM

(75) Inventors: Satish Sharadrao Khanke, Aurangabad (IN); Melhulkumar Babubhai Patel, Vadodara (IN)

(73) Assignee: General Electric Company, Schenectady, NY (US)

( * ) Notice: Subject to any disclaimer, the term of this patent is extended or adjusted under 35 U.S.C. 154(b) by 660 days.

(21) Appl. No.: 13/105,273

(22) Filed: May 11, 2011

(65) Prior Publication Data

US 2012/0290975 A1    Nov. 15, 2012

(51) Int. Cl.
*G06F 3/048* (2013.01)
*G01D 4/00* (2006.01)

(52) U.S. Cl.
CPC .............. *G06F 21/102* (2013.01); *G01D 4/002* (2013.01)
USPC .......................................... 715/810; 715/748

(58) Field of Classification Search
CPC .............................. G01D 4/002; G06F 21/105
USPC .................................................. 715/810, 748
See application file for complete search history.

(56) References Cited

U.S. PATENT DOCUMENTS

| | | | |
|---|---|---|---|
| 4,757,456 A * | 7/1988 | Benghiat | 705/412 |
| 5,079,600 A | 1/1992 | Schnur et al. | |
| 5,602,744 A * | 2/1997 | Meek et al. | 705/412 |
| 5,715,390 A | 2/1998 | Hoffman et al. | |
| 5,735,844 A | 4/1998 | Anderson et al. | |
| 5,874,903 A | 2/1999 | Shuey et al. | |
| 6,088,505 A | 7/2000 | Hobbs | |
| 6,088,659 A * | 7/2000 | Kelley et al. | 702/62 |
| 6,199,068 B1 | 3/2001 | Carpenter | |
| 6,243,219 B1 | 6/2001 | Hutcheson et al. | |
| 6,285,817 B1 | 9/2001 | Hobbs | |
| 6,611,773 B2 | 8/2003 | Przydatek et al. | |
| 6,671,654 B1 | 12/2003 | Forth et al. | |
| 6,694,799 B2 | 2/2004 | Small | |
| 6,718,271 B1 | 4/2004 | Tobin | |
| 6,792,337 B2 | 9/2004 | Blackett et al. | |
| 6,946,972 B2 | 9/2005 | Mueller et al. | |
| 7,127,328 B2 | 10/2006 | Ransom | |
| 7,188,003 B2 | 3/2007 | Ransom et al. | |
| 7,216,108 B2 | 5/2007 | Hastings et al. | |

(Continued)

FOREIGN PATENT DOCUMENTS

WO    2006000033 A1    1/2006

OTHER PUBLICATIONS

European Patent Application Serial No. 12167386.7, Extended European Search Report dated Jan. 9, 2014.

*Primary Examiner* — Omar Abdul-Ali
(74) *Attorney, Agent, or Firm* — William Heinze; Hoffman Warnick LLC

(57) ABSTRACT

Systems and devices are disclosed for enabling direct transfer of feature licenses between utility meters. In one embodiment, a system includes: a computing device communicatively connected to a first utility meter and a second utility meter, the computing device adapted to manage a transfer of a feature license between the first utility meter and the second utility meter by performing actions comprising: obtaining feature license data about the first utility meter and the second utility meter; receiving a selection of the feature license to be transferred from the first utility meter to the second utility meter; and transferring the selected feature license from the first utility meter to the second utility meter.

20 Claims, 6 Drawing Sheets

(56) References Cited

U.S. PATENT DOCUMENTS

| | | |
|---|---|---|
| 7,249,265 B2 | 7/2007 | Von Carolsfeld |
| 7,250,874 B2 | 7/2007 | Mueller et al. |
| 7,304,587 B2 | 12/2007 | Boaz |
| 7,321,316 B2 | 1/2008 | Hancock et al. |
| 7,322,972 B2 | 1/2008 | Viator et al. |
| 7,336,422 B2 | 2/2008 | Dunn et al. |
| 7,340,129 B2 | 3/2008 | Yalin et al. |
| 7,398,160 B2 | 7/2008 | Morrow et al. |
| 7,400,264 B2 | 7/2008 | Boaz |
| 7,420,662 B2 | 9/2008 | Yalin et al. |
| 2002/0116139 A1 | 8/2002 | Przydatek et al. |
| 2002/0145537 A1 | 10/2002 | Mueller et al. |
| 2003/0093433 A1 | 5/2003 | Seaman et al. |
| 2003/0110380 A1 | 6/2003 | Carolsfeld et al. |
| 2003/0159498 A1 | 8/2003 | Small |
| 2004/0034603 A1 | 2/2004 | Hastings et al. |
| 2004/0039379 A1 | 2/2004 | Viator et al. |
| 2004/0138786 A1 | 7/2004 | Blackett et al. |
| 2004/0220869 A1 | 11/2004 | Perera |
| 2005/0270173 A1 | 12/2005 | Boaz |
| 2006/0031180 A1* | 2/2006 | Tamarkin et al. ............. 705/412 |
| 2006/0032471 A1 | 2/2006 | Yalin et al. |
| 2006/0037572 A1 | 2/2006 | Yalin et al. |
| 2006/0064254 A1 | 3/2006 | Morrow et al. |
| 2006/0066455 A1 | 3/2006 | Hancock et al. |
| 2006/0066457 A1 | 3/2006 | Mueller et al. |
| 2006/0218104 A1* | 9/2006 | Johnson et al. ............... 705/412 |
| 2006/0262411 A1 | 11/2006 | Dunn et al. |
| 2006/0265489 A1 | 11/2006 | Moore |
| 2007/0001868 A1 | 1/2007 | Boaz |
| 2007/0013547 A1 | 1/2007 | Boaz |
| 2007/0055640 A1* | 3/2007 | Dababneh et al. ............ 705/412 |
| 2007/0061266 A1 | 3/2007 | Moore et al. |
| 2007/0061487 A1 | 3/2007 | Moore et al. |
| 2007/0241930 A1 | 10/2007 | Qureshi et al. |
| 2007/0284547 A1 | 12/2007 | Sejersen et al. |
| 2008/0048883 A1 | 2/2008 | Boaz |
| 2008/0118862 A1 | 5/2008 | Dunn et al. |
| 2008/0147530 A1 | 6/2008 | Kwan et al. |
| 2008/0272934 A1 | 11/2008 | Wang et al. |
| 2009/0072161 A1 | 3/2009 | Ben-Yakar et al. |
| 2009/0274304 A1 | 11/2009 | Kobayashi |
| 2009/0307573 A1 | 12/2009 | Lavelle et al. |
| 2009/0319415 A1 | 12/2009 | Stoilov et al. |

* cited by examiner

FEATURE LICENSE MANAGEMENT SYSTEM

BACKGROUND OF THE INVENTION

The subject matter disclosed herein relates generally to meter technology, and more particularly, to a management system for the transfer of feature licenses between utility meters.

Some utility companies, for example, certain electrical or gas service companies, employ utility meters to regulate and/or record the amount of service (e.g. electricity) being consumed by a given location or consumer. The design of these utility meters includes numerous hardware/firmware components which increase meter functionality and versatility, providing a variety of features to the consumer and the utility. Access to and use of these components, and the features they provide, is limited and/or controlled on each utility meter by feature licenses, feature keys, soft keys, soft switches etc. These feature licenses generally include firmware which is installed on the utility meter to enable use (i.e. authorized access, appropriate payment for feature access, etc.) of the varied features available on each utility meter. However, maintenance and installation of feature licenses includes the use of a license pool from which licenses are exchanged onto memory devices to be selectively uploaded onto each utility meter. The memory devices, such as smart cards/hardware dongles, serve as intermediaries in the feature license transfer process. A smart card obtains a feature license from the license pool and then is physically brought to a location to transfer the feature license on to the utility meter via software and a smartcard reader. The multiple steps and intermediate devices required in the current feature license transfer process may serve to slow, complicate and increase the cost of a transfer.

Referring to FIG. 1, a schematic view of a known electronic utility meter 102 is shown with hardware components. Electronic utility meter 102 illustrated in FIG. 1 is a known electronic watt-hour meter and may include terminal blades 104, a meter base 106, potential links 108, current transformers 110, a switch 112 to turn on and off service, a metering circuit 114 supported by metering circuit brackets 116, a cover 118 to protect components, and a user button 120 which activates switch 112. The various features which may be available to a consumer/user via hardware components such as metering circuit 114, potential links 108, current transformers 110 etc. may be enabled or disabled by feature licenses.

BRIEF DESCRIPTION OF THE INVENTION

Systems and devices for managing a transfer of feature licenses between utility meters are disclosed. In one embodiment, a system includes: a computing device communicatively connected to a first utility meter and a second utility meter, the computing device adapted to manage a transfer of a feature license between the first utility meter and the second utility meter by performing actions comprising: obtaining feature license data about the first utility meter and the second utility meter; receiving a selection of the feature license to be transferred from the first utility meter to the second utility meter; and transferring the selected feature license from the first utility meter to the second utility meter.

A first aspect of the invention provides a system including: a computing device communicatively connected to a first utility meter and a second utility meter, the computing device adapted to manage a transfer of a feature license between the first utility meter and the second utility meter by performing actions comprising: obtaining feature license data about the first utility meter and the second utility meter; receiving a selection of the feature license to be transferred from the first utility meter to the second utility meter; and transferring the selected feature license from the first utility meter to the second utility meter.

A second aspect provides a program product stored on a computer readable medium, which when executed by a computing device performs the following: obtains feature license data about the first utility meter and the second utility meter; selects a feature license to transfer from the first utility meter to the second utility meter; disables the selected feature license on the first utility meter; and enables the selected feature license on the second utility meter.

A third aspect of the invention provides a system including: a network communicatively connected to a first utility meter and a second utility meter; and a computing device communicatively connected to the network, the computing device adapted to directly transfer a feature license between the first utility meter and the second utility meter by performing actions comprising: determining a first set of feature licenses installed on the first utility meter; determining a second set of feature licenses installed on the second utility meter; selecting the feature license to be transferred from the first utility meter to the second utility meter; removing the selected feature license from the first utility meter; and installing the selected feature license on the second utility meter.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
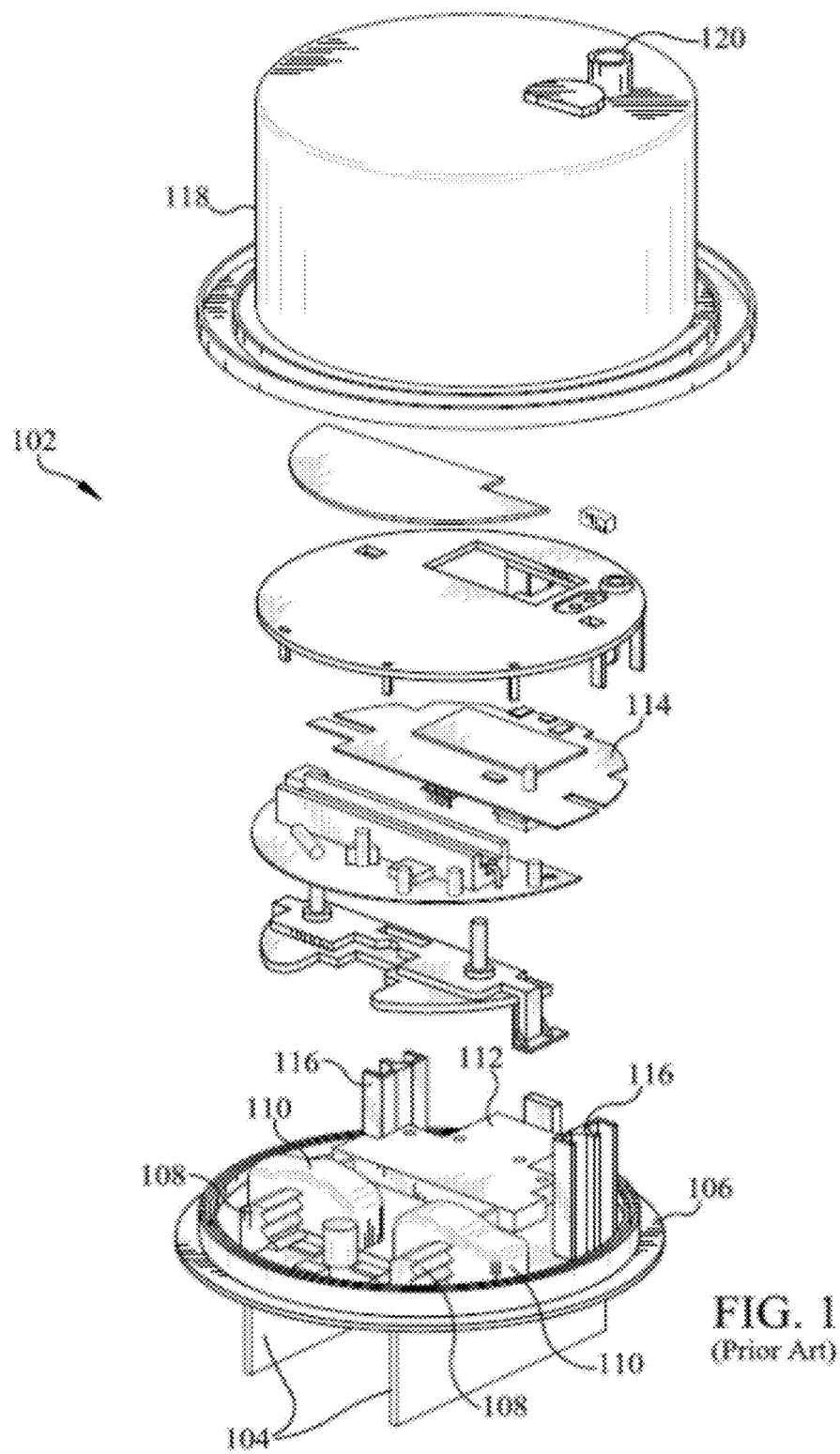
FIG. 1 shows a schematic illustration of a known electrical utility meter.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, aspects of the invention provide for systems and devices configured to enable the transfer of feature licenses between utility meters. A computing device is configured such that it may connect to either or both of a source utility meter and a destination utility meter. The computing device may, via the connection(s) between the source utility meter and the destination utility meter, allow a user/technician to manage the transfer of a feature license(s) there between. The feature license(s) may be transferred via a utility network, a local network, a serial connection, Universal Serial Bus (USB) ports, optical ports, a RadioFrequency (RF) link, a Transmission Control Protocol/Internet Protocol (TCP/IP) connection, a Worldwide Interoperability for Microwave Access (WiMax) connection, or any other form of connection or combination of connections known in the art. As a result of utilizing aspects of the invention a utility company and/or user may be able to quickly upgrade and update existing utility meters by directly transferring feature licenses between the existing utility meters.

In the art of metered services and systems, utility meters (including, e.g., electrical meters, smart meters, power meters, gas meters, etc.) are used to track and record service consumption. Recently, the features and functions available on these utility meters have begun to increase. Access to these features is controlled on each utility meter by feature licenses/keys which are obtained/purchased by the utility company from energy meter manufacturers. In response to a change in the service plan of a consumer/user, a technician for the utility company may upload or download feature licenses from a utility meter via a memory device. Thereby, enabling or disabling specific features and functions on the utility meter. However, the transfer of feature licenses involves multiple exchanges of data and feature licenses across many devices. The use of a memory device as an intermediary for the transport of a feature license between a license pool and a utility meter increases the cost and complexity of the transfer. The memory device may be expensive to purchase and maintain, and use of the memory device requires that the feature license be written into and read off of the memory device, complicating the coding process. Additionally, the user/technician is required to oversee each transfer of the feature license and in some cases physically move and/or connect the memory device so as to complete a transfer.

In contrast to the conventional system, embodiments of the current invention provide for a system which facilitates the transfer of feature licenses directly between utility meters. The system includes a computing device which is communicatively connected to a plurality of utility meters. The computing device is configured to identify a source utility meter and a destination utility meter, the source utility meter containing a feature license to be transferred to the destination utility meter. Once identified the computing device manages the transfer of the feature license from the source utility meter to the destination utility meter, removing/disabling the feature license from the source utility meter and installing/enabling the feature license on the destination utility meter. As the feature license is transferred directly between utility meters, the coding process is simplified, user/technician involvement is minimized and the use of an intermediary such as a memory device is eliminated.

As will be appreciated by one skilled in the art, the management system described herein may be embodied as a system(s), method(s) or computer program product(s), e.g., as part of a utility network system, utility network, utility meter, etc. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module," "network" or "system." Furthermore, the present invention may take the form of a computer program product embodied in any tangible medium of expression having computer-usable program code embodied in the medium.

Any combination of one or more computer usable or computer readable medium(s) may be utilized. The computer-useable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
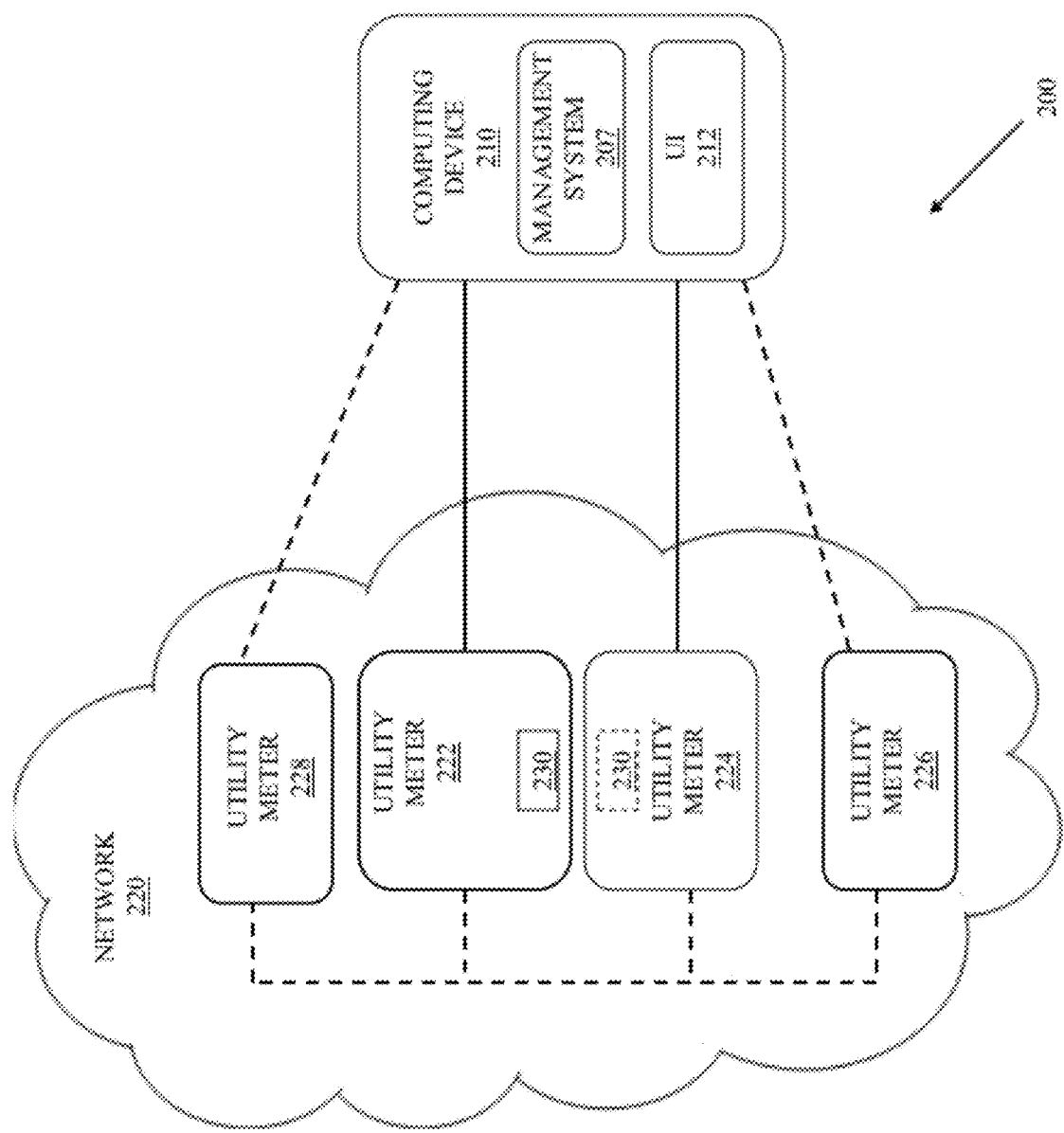
FIG. 2 shows a schematic illustration of an environment including a management system in accordance with an embodiment of the invention.

Turning to the figures, embodiments of a feature license management system are shown, where the feature license management system facilitates the transfer of feature licenses between a plurality of utility meters. Each of the components in the Figures may be connected via conventional means, e.g., via wireless mesh, WiFi, power-line communication, cellular, radio-frequency link, WiMax, optical port, USB port or other known means as is indicated in the FIGS. 2-6. Specifically, referring to FIG. 2, a schematic illustration of an embodiment of a feature license management system 200 is shown. Feature license management system 200 may include a management system 207 disposed on a computing device 210 which is communicatively connected to a utility meter 222 and a utility meter 224. Utility meter 222 and utility meter 224 may comprise an electrical meter, a water meter, a gas meter, a smart meter or any other form of utility meter as is known in the art. Utility meter 222 and utility meter 224 may or may not be interconnected via a coupling, network, communication channel etc. Management system 207 may direct computing device 210 to select utility meter 222 as a source and identify a feature license 230 on utility meter 222 to transfer to utility meter 224. Feature license 230 may include a set of distinct or interrelated feature licenses/keys. Computing device 210 may then transfer feature license 230 from utility meter 222 to utility meter 224. In one embodiment, computing device 210 may use a Network 220 to transfer or enable the transfer of feature license 230 from utility meter 222 to utility meter 224. In one embodiment, computing device 210 may directly transfer feature license 230 from utility meter 222 to utility meter 224 via Network 220. Network 220 may include any of an Advanced Metering Infrastructure (AMI), a utility network, a Neighborhood Area Network (NAN), a Local Area Network (LAN) or any other form of network as is known in the art. In this embodiment of the invention, computing device 210 may disable feature license 230 on utility meter 222 and enable feature license 230 on utility meter 224.

In an embodiment of the present invention, computing device 210 may include a user interface (UI) 212. In one embodiment, UI 212 may be generated by management system 207. UI 212 may include a Graphical User Interface (GUI). In one embodiment, a user may, via UI 212, select source utility meter 222 and destination utility meter 224 by inputting the respective address of each utility meter or by selecting each utility meter from a database of available utility meters. In one embodiment, computing device 210 may display on UI 212 feature licenses 230 installed on either or both of utility meter 222 and utility meter 224. In another embodiment, computing device 210 may comparatively display on UI 212 all feature licenses 230 on both of utility meter 222 and utility meter 224, listing the feature licenses 230 side by side for a user to view and compare. In one embodiment, computing device 210 may provide to a user via UI 212 the option to select feature license 230 to be transferred from utility meter 222 to utility meter 224. In one embodiment, computing device 210 may receive a user selection via UI 212 and transfer feature license 230 in response to the user selection. In another embodiment, computing device 210 enables a prompt on UI 212 to confirm transfer of feature license 230 between utility meter 222 and utility meter 224 before transferring feature license 230. In another embodiment, UI 212 displays the updated feature licenses 230 on utility meter 222 and utility meter 224. In another embodiment, computing device 210 may transfer feature license 230 between any of a utility meter 226, a utility meter 228, utility meter 222 and utility meter 224. In one embodiment, any of utility meter 222, utility meter 224, utility meter 226 and utility meter 228 may display feature licenses 230 contained thereon. In another embodiment, UI 212 may enable a user to select any number of feature licenses 230 to be transferred between any of utility meter 226, utility meter 228, utility meter 222 and utility meter 224. In one embodiment, UI 212 may be located remote relative to computing device 210. In another embodiment, UI 212 and computing device 210 may be located remote relative to any of utility meter 226, utility meter 228, utility meter 222 and utility meter 224. In another embodiment, computing device 210 and UI 212 may be located at utility meter 222 and be configured to manage transfers of feature license 230 to any of utility meter 224, utility meter 226 and utility meter 228. It is understood that each utility meter 222, 224, 226 and 228 may be connected to network 220 and/or each other via the same or substantially different communication paths/communication mediums in the software (e.g. serial communication, TCP/IP communication, etc.).

In any event, computing device 210 can comprise any general purpose computing article of manufacture capable of executing computer program code installed by a user (e.g., a personal computer, server, handheld device, etc.). However, it is understood that computing device 210, graphical user interface 212, utility meter 226, utility meter 228, utility meter 222 and utility meter 224 are only representative of various possible equivalent computing devices that may perform the various process steps of the disclosure. To this extent, in other embodiments, computing device 210 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Figure 3:
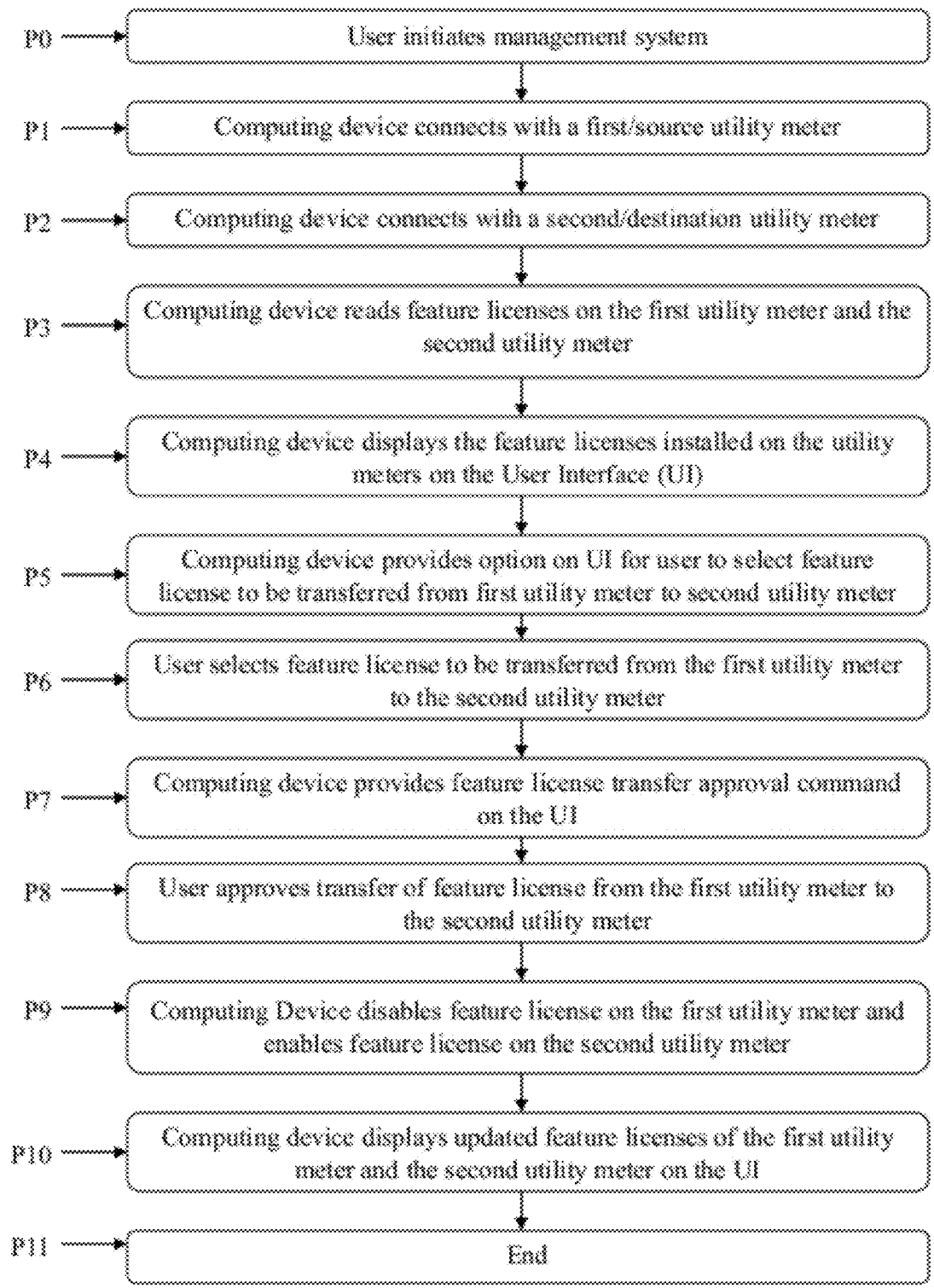
FIG. 3 shows a method flow diagram illustrating a process according to embodiments of the invention.

Turning to FIG. 3, an illustrative method flow diagram is shown according to embodiments of the invention: In pre-process P0, a management system is initiated on computing device 210 to begin a transfer of feature license 230 between any of utility meter 222, 224, 226 and 228. That is, either a scheduled transfer or a user-commanded transfer may be performed by computing device 210 in response to a prompt to transfer feature license 230 between any of utility meter 222, 224, 226 and 228. Following pre-process P0, in process P1, computing device 210 connects with a first utility meter 222, first utility meter 222 to serve as a source utility meter 222. Following process P1, in process P2, computing device 210 connects with a second utility meter 224, the second utility meter 224 to serve as a destination utility meter 224. First utility meter 222 and second utility meter 224 may be chosen as source and destination meters respectively based on any of a computer database, user knowledge, an inventory query, a feature license log or any other form of feature license tracking system as is known. First utility meter 222 may be identified as the source meter because meter license 230 is to be removed therefrom and installed on the destination meter, second utility meter 224. Following process P2, in process P3, computing device 210 obtains feature license data including but not limited to feature license identification, feature license activation state (enabled or disabled), feature license compatibility, a meter(s) configuration table, a software configuration table, etc., from and reads the feature licenses 230 on first utility meter 222 and second utility meter 224. That is, computing device 210 communicates with first utility meter 222 and second utility meter 224 to obtain data for feature licenses 230 installed on each utility meter. After process P3, in process P4, computing device 210 displays feature licenses 230 installed on either or both of first utility meter 222 and second utility meter 224 on UI 212. Following process P4, in process P5, computing device 210 provides an option or prompt on UI 212 for a user to select a feature license 230 to transfer from first utility meter 222 to second utility meter 224.

After process P5, in process P6, a user selects feature license 230 to transfer from first utility meter 222 to second utility meter 224. In one embodiment the user may select feature license 230 by checking a box graphically displayed next to feature license 230 on UI 212. Following process P6, in process P7, once a user selects a feature license 230 to transfer, computing device 210 may provide a confirmation prompt on UI 212, the confirmation prompt for user confirmation of the transfer. Following process P7, in process P8, user confirms the transfer of feature license 230. After process P8, in process P9, computing device 210 disables feature license 230 on first utility meter 222 and enables feature license 230 on second utility meter 224. In one embodiment, feature license 230 may be first disabled on first utility meter 222 and then enabled on second utility meter 224. In another embodiment, feature license 230 may be first enabled on second utility meter 224 and then disabled on first utility meter 222. In another embodiment, feature license 230 may be substantially simultaneously disabled on first utility meter 222 and enabled on second utility meter 224. In any event, following process P9, in process P10, computing device 210 displays the updated feature licenses of first utility meter 222 and second utility meter 224 on UI 212. After process P10, in process P11, the program ends.

The data flow diagram and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
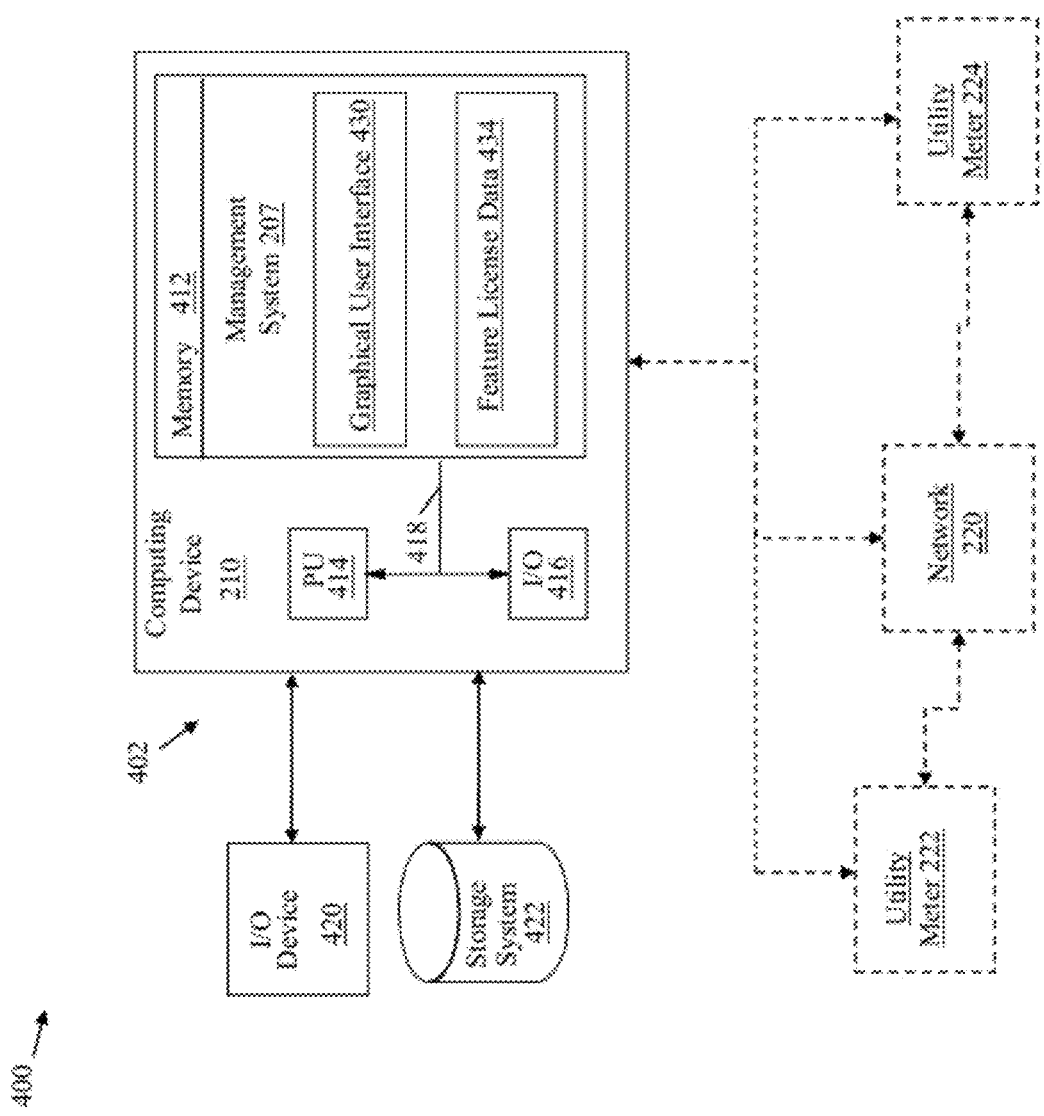
FIG. 4 shows a schematic illustration of an environment including a management system in accordance with an embodiment of the invention.

Turning to FIG. 4, an illustrative environment 400 including a management system 207 is shown according to embodiments of the invention. Environment 400 includes a computer infrastructure 402 that can perform the various processes described herein. In particular, computer infrastructure 402 is shown including computing device 210 which includes management system 207, which enables computing device 210 to manage transfers of feature licenses between utility meter 222 and utility meter 224 by performing the process steps of the disclosure.

As previously mentioned and discussed further below, management system 207 has the technical effect of enabling computing device 210 to perform, among other things, the feature license management functions described herein. It is understood that some of the various components shown in FIG. 4 can be implemented independently, combined, and/or stored in memory for one or more separate computing devices that are included in computing device 210. Further, it is understood that some of the components and/or functionality may not be implemented, or additional schemas and/or functionality may be included as part of feature license management system 200.

Computing device 210 is shown including a memory 412, a processor unit (PU) 414, an input/output (I/O) interface 416, and a bus 418. Further, computing device 210 is shown in communication with an external I/O device/resource 420 and a storage system 422. As is known in the art, in general, processor 414 executes computer program code, such as management system 207, that is stored in memory 412 and/or storage system 422. While executing computer program code, processor 414 can read and/or write data, such as graphical user interface 430 and/or feature license data 434, to/from memory 412, storage system 422, and/or I/O interface 416. Bus 418 provides a communications link between each of the components in computing device 210. I/O device 420 can comprise any device that enables a user to interact with computing device 210 or any device that enables computing device 210 to communicate with one or more other computing devices. Input/output devices (including but not limited to keyboards, displays, pointing devices, etc.) can be coupled to the system either directly or through intervening I/O controllers.

In some embodiments, as shown in FIG. 4, environment 400 may optionally include utility meter 222, utility meter 224 and network 220 communicatively connected to management system 207 through computing device 210 (e.g., via wireless or hard-wired means). In some embodiments, computing device 210 and/or management system 207 may be disposed upon or within utility meter 222 and/or utility meter 224.

Figure 5:
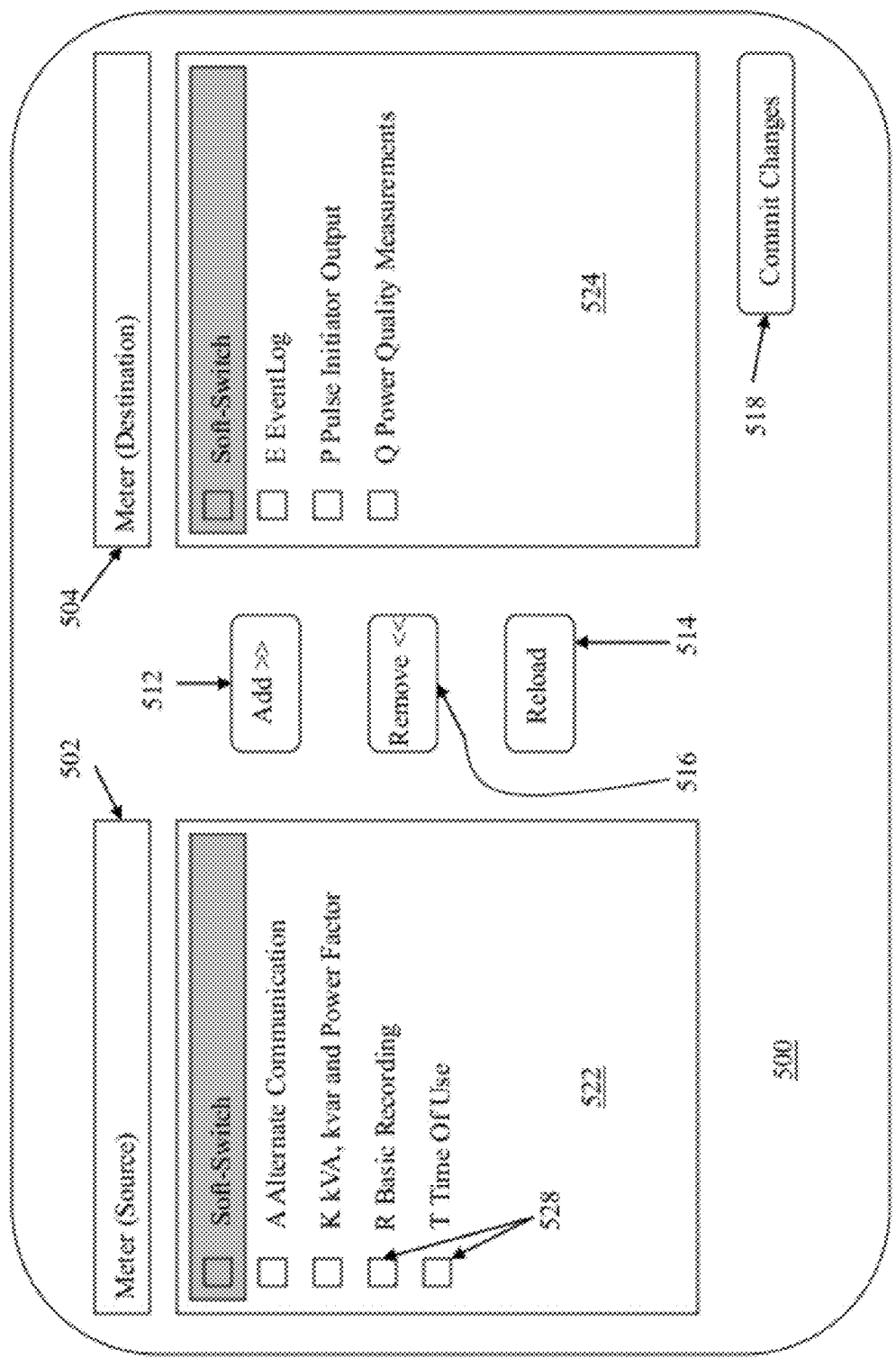
FIG. 5 shows a schematic illustration of a user interface according to embodiments of the invention.
Figure 6:
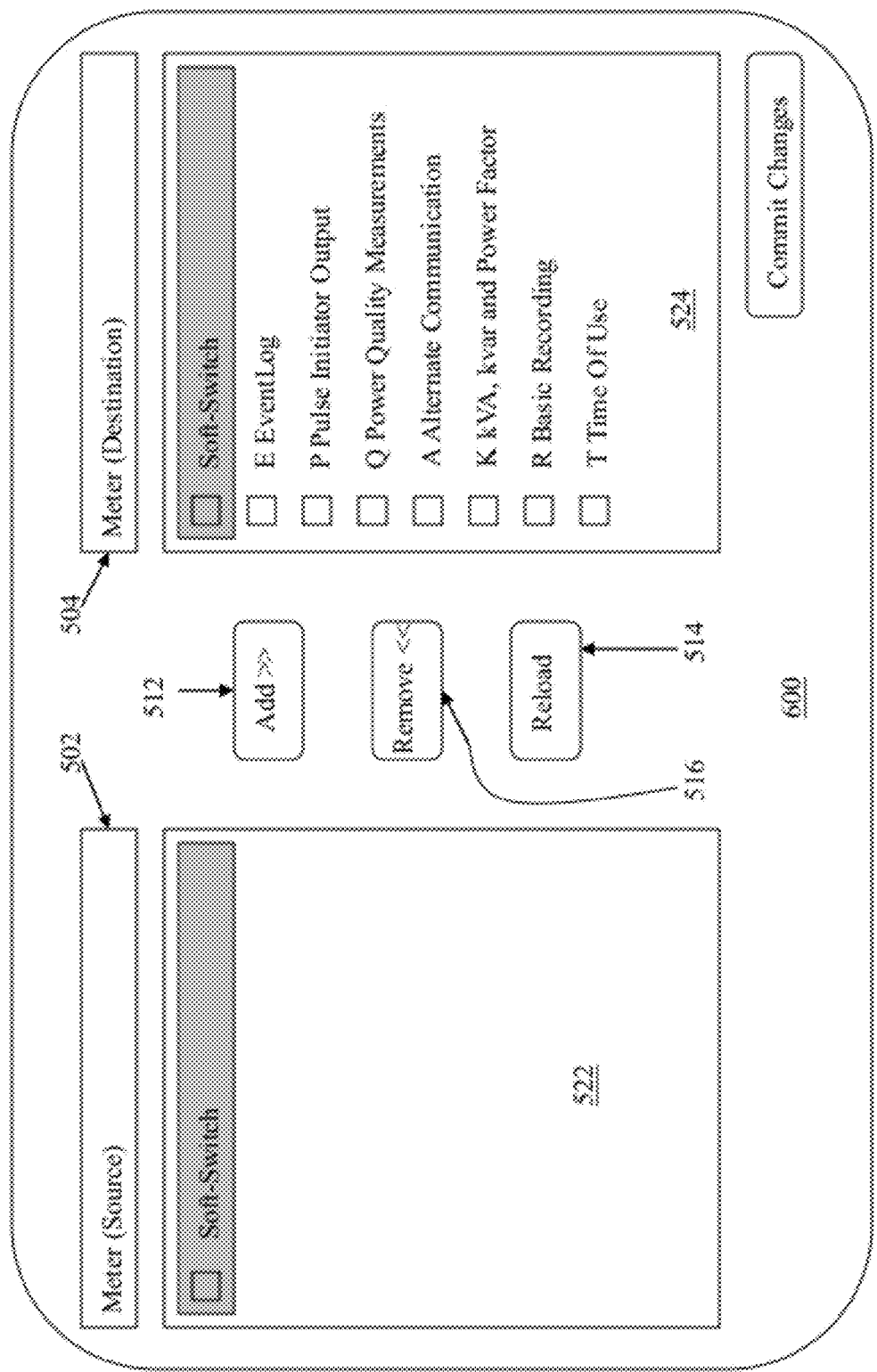
FIG. 6 shows a schematic illustration of a user interface according to embodiments of the invention.

Turning to FIG. 5, a schematic illustration of a User Interface (UI) 500 is shown according to embodiments of the invention. UI 500 includes a first meter identification field 502 for the source utility meter and a second meter identification field 504 for the destination utility meter, identification field 502 and identification field 504 for displaying which utility meters computing device 210 is connected to. These fields may display the meter IP address, meter ID, meter serial number or other known identifying features as are known. A feature license list window 522 and a feature license list window 524 may be disposed beneath identification field 502 and identification field 504 on UI 500. Feature license list windows 522 and 524 display the feature license contents of the utility meters connected to computing device 210. It is understood that the feature licenses shown in feature license list windows 522 and 524 of FIG. 5 are exemplary, and that feature license list windows 522 and 524 may display any feature license known. Feature license selection boxes 528 may be included in either or both of feature license list window 522 and feature license list window 524, feature license selection boxes 528 may be disposed beside each feature license contained on the respective utility meters. Feature license selection boxes 528 for enabling a user to individually select a feature license to be transferred. UI 500 may further include feature license add command button 512, feature license remove command button 516, reload command button 514 and commit changes command button 518. Add command button 512 and remove command button 516 for moving feature licenses between meters and list windows 522 and 524. Commit changes command button 518 to confirm/perform a transfer of feature license 230 between utility meters. Reload command button 514 for refreshing feature license list window 522 and feature license list window 524. These commands enable a user to transfer selected feature licenses between utility meters. In FIG. 5, a variety of feature licenses are shown installed on both a source utility meter and a destination utility meter before being transferred between the utility meters. These feature licenses being distributed among the utility meters and displayed in feature license list window 522 and feature license list window 524. Turning to FIG. 6, a schematic illustration of User Interface (UI) 600 is shown according to embodiments of the invention. UI 600 shows feature license list window 522 and feature license list window 524 after a transfer has been completed between the source utility meter and the destination utility meter.

The feature license management system of the present disclosure is not limited to any one particular meter, electrical meter, smart meter, network or other system, and may be used with other power and communication systems. Additionally, the feature license management system of the present invention may be used with other systems not described herein that may benefit from the simplified, secure, direct transfer of feature licenses provided by the feature license management system described herein.

As discussed herein, various systems and components are described as "obtaining" and/or "transferring" data (e.g., firmware, feature license, feature key, software, etc.). It is understood that the corresponding data can be obtained using any solution. For example, the corresponding system/component can generate and/or be used to generate the data, retrieve the data from one or more data stores or sensors (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a computing device communicatively connected to a first utility meter and a second utility meter, the computing device being connected to each of the first utility meter and the second utility meter through a first connection, the first utility meter and the second utility meter being communicatively connected through a second connection independent of the computing device, wherien the computing device is adapted to manage a transfer of a feature license directly between the first utility meter and the second utility meter through the second connection by performing actions comprising:
   obtaining feature license data about the first utility meter and the second utility meter;
   receiving a selection of the feature license to be transferred directly between the first utility meter and the second utility meter; and
   initiating the transfer of the selected feature license directly between the first utility meter and the second utility meter.

2. The system of claim 1, further comprising a user interface (UI) operably connected to the computing device.

3. The system of claim 1, wherein the computing device is operably connected to a user interface (UI) and the receiving of the selection of the feature license to be transferred directly between the first utility meter and the second utility meter further includes:
   displaying on the UI a first set of feature licenses installed on the first utility meter;
   displaying on the UI a second set of feature licenses installed on the second utility meter; and
   prompting a user to select the feature license to be transferred directly between the first utility meter and the second utility meter.

4. The system of claim 3, wherein the user interface is further adapted to comparatively display any feature licenses enabled on the first utility meter and any feature licenses enabled on the second utility meter.

5. The system of claim 1, wherein the computing device is further adapted to transfer a plurality of feature licenses between the first utility meter and the second utility meter.

6. The system of claim 1, wherein the feature license data includes feature license compatibility.

7. The system of claim 1, wherein the first utility meter includes the computing device.

8. A program product stored on a computer readable medium, which when executed by at least one computing device communicatively connected to a first utility meter and a second utility meter through a first connection, wherein the first utility meter and the second utility meter are communicatively connected through a second connection independent of the computing device, performs the following:
   obtains feature license data about the first utility meter and the second utility meter;
   receives a selection of a feature license to transfer directly between the first utility meter and the second utility meter; and
   initiates a transfer of the selected feature license directly between the first utility meter and the second utility meter through the second connection.

9. The program product of claim 8, wherein the computing device is further adapted to create a User Interface (UI).

10. The program product of claim 9, wherein the computing device is further adapted to comparatively display any feature licenses enabled on the first utility meter and any feature licenses enabled on the second utility meter on the UI.

11. The program product of claim 8, wherein the computing device is further adapted to create a user interface (UI) and the receiving of the selection of the feature license to be transferred directly between the first utility meter and the second utility meter further includes:
   displaying on the UI a set of feature licenses installed on the first utility meter;
   displaying on the UI a set of feature licenses installed on the second utility meter; and
   prompting a user to select the feature license to be transferred directly between the first utility meter and the second utility meter.

12. The program product of claim 8, wherein the computing device is further adapted to transfer a plurality of feature licenses between the first utility meter and the second utility meter.

13. The program product of claim 8, wherein the feature license data includes feature license compatibility.

14. The program product of claim 8, wherein the first utility meter includes the computing device.

15. A system comprising:
- a computing device communicatively connected to a network, through a first connection, a first utility meter and a second utility meter being communicatively connected to the network through a second connection independent of the computing device wherein, the computing device is adapted to directly transfer a feature license between the first utility meter and the second utility meter through the second connection by performing actions comprising:
    - determining a first set of feature licenses installed on the first utility meter;
    - determining a second set of feature licenses installed on the second utility meter;
    - receiving a selection of the feature license to be transferred directly between the first utility meter and the second utility meter;
    - initiating the transfer of the selected feature license directly between the first utility meter and the second utility meter.

16. The system of claim 15, wherein the computing device is communicatively connected to a plurality of utility meters through the network.

17. The system of claim 15, further comprising a user interface operably connected to the computing device.

18. The system of claim 17, wherein the user interface is further adapted to comparatively display any feature licenses installed on the first utility meter and any feature licenses installed on the second utility meter.

19. The system of claim 15, wherein the computing device is operably connected to a user interface (UI) and the receiving of the selection of the feature license to be transferred directly between the first utility meter and the second utility meter further includes:
- displaying on the user interface a set of feature licenses on the first utility meter;
- displaying on the user interface a set of feature licenses on the second utility meter; and
- prompting a user to select the feature license to be transferred directly between the first utility meter and the second utility meter.

20. The system of claim 15, wherein the computing device is further adapted to transfer a plurality of feature licenses between the first utility meter and the second utility meter.

* * * * *